US010573917B2

(12) United States Patent
Naito

(10) Patent No.: US 10,573,917 B2
(45) Date of Patent: **\*Feb. 25, 2020**

(54) FUEL CELL SYSTEM

(71) Applicant: HONDA MOTOR CO., LTD., Minato-ku, Tokyo (JP)

(72) Inventor: Hideharu Naito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 15/451,800

(22) Filed: Mar. 7, 2017

(65) Prior Publication Data

US 2017/0263968 A1 Sep. 14, 2017

(30) Foreign Application Priority Data

Mar. 8, 2016 (JP) .................................. 2016-044274
Mar. 8, 2016 (JP) .................................. 2016/044277

(51) Int. Cl.
*H01M 8/2475* (2016.01)
*B60L 50/71* (2019.01)
*H01M 8/1018* (2016.01)

(52) U.S. Cl.
CPC ........... *H01M 8/2475* (2013.01); *B60L 50/71* (2019.02); *H01M 2008/1095* (2013.01); *H01M 2250/20* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| 2005/0014058 A1* | 1/2005 | Dave ................... H01M 8/0271 429/460 |
| 2011/0104585 A1* | 5/2011 | DiCostanzo ........ H01M 8/2485 429/508 |
| 2012/0181712 A1* | 7/2012 | Vanderwees ...... H01M 8/04074 261/102 |
| 2014/0322626 A1* | 10/2014 | Naito ................... H01M 8/2475 429/467 |

FOREIGN PATENT DOCUMENTS

| JP | 2006-236611 A | | 9/2006 |
| JP | 2006236611 A | * | 9/2006 |
| JP | 2013-152830 A | | 8/2013 |
| JP | 2014-096285 A | | 5/2014 |
| JP | 2014-130723 A | | 7/2014 |

(Continued)

OTHER PUBLICATIONS

JP2006-236611A, Wakahoi, Machine Translation, Sep. 2006 (Year: 2006).*

(Continued)

*Primary Examiner* — Devina Pillay
(74) *Attorney, Agent, or Firm* — Carrier Blackman & Associates, P.C.; William D. Blackman; Joseph P. Carrier

(57) ABSTRACT

A fuel cell system includes a fuel cell stack and a stack case. Curved portions are formed at corners of a first end plate. An upper plate includes curving sections facing the curved portions of the first end plate. An upper seal member is partially interposed between the curved portions of the first end plate and the curving sections of the upper plate.

10 Claims, 12 Drawing Sheets

(56) References Cited

FOREIGN PATENT DOCUMENTS

| JP | 2014-216268 A | 11/2014 |
|----|---------------|---------|
| JP | 2014-216269 A | 11/2014 |

OTHER PUBLICATIONS

Office Action dated Oct. 24, 2017 issued over the corresponding Japanese Patent Application No. 2016-044277 with the English machine translation thereof.
Office Action dated Oct. 17, 2017 issued over the corresponding Japanese Patent Application No. 2016-044274 with the English translation thereof.

* cited by examiner

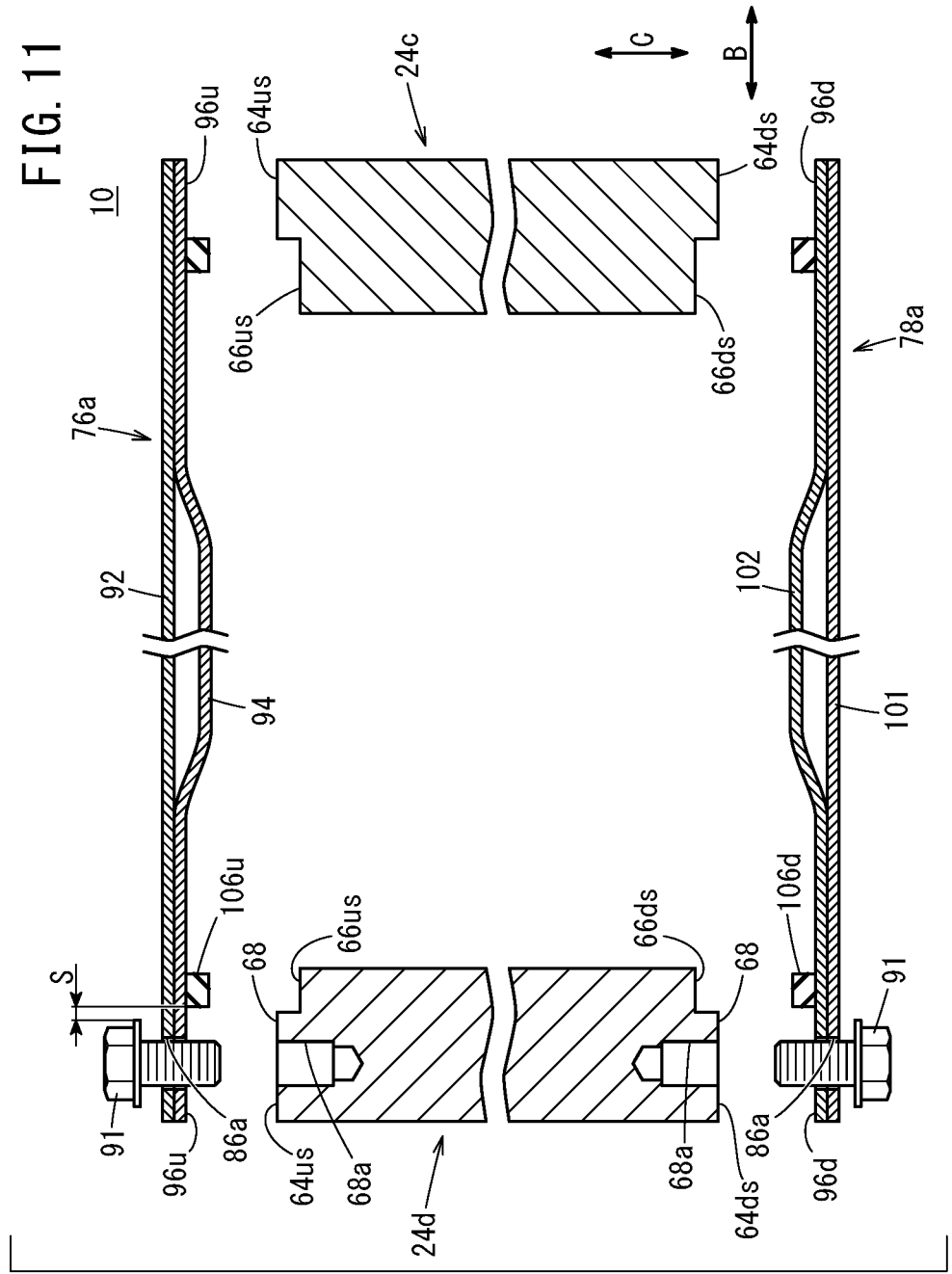

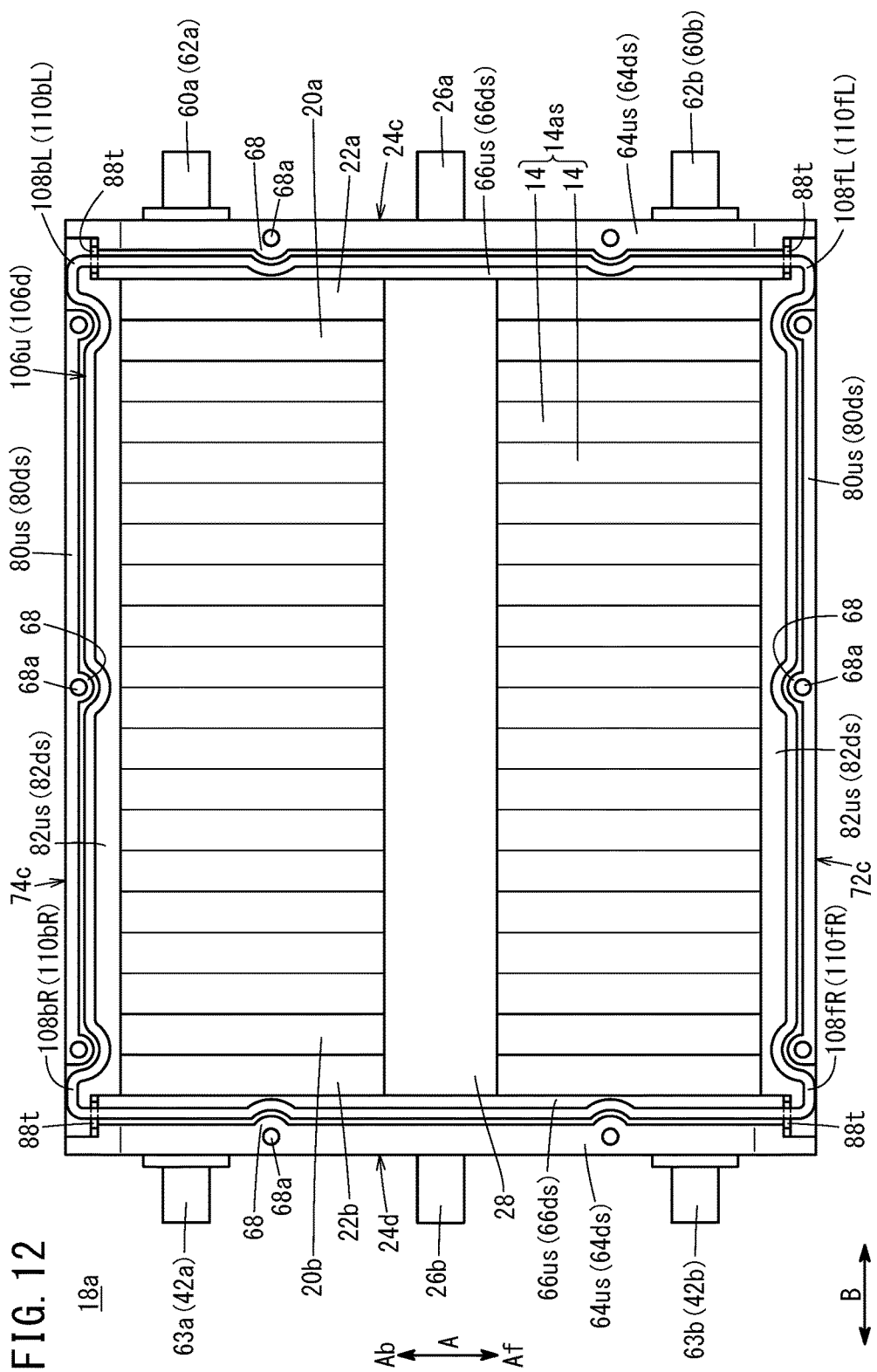

FUEL CELL SYSTEM

CROSS-REFERENCE TO RELATED APPLICATIONS

This application is based upon and claims the benefit of priority from Japanese Patent Applications No. 2016-044274 filed on Mar. 8, 2016 and No. 2016-044277 filed on Mar. 8, 2016, the contents all of which are incorporated herein by reference.

BACKGROUND OF THE INVENTION

Field of the Invention

The present invention relates to a fuel cell system including a fuel cell stack formed by stacking a plurality of power generation cells and a stack case containing the fuel cell stack.

Description of the Related Art

For example, a solid polymer electrolyte fuel cell includes a membrane electrode assembly (MEA) having an electrolyte membrane. The electrolyte membrane is a solid polymer electrolyte membrane. An anode is provided on one surface of the electrolyte membrane, and a cathode is provided on the other surface of the electrolyte membrane. The membrane electrode assembly is sandwiched between separators (bipolar plates) to form a power generation cell. Normally, a predetermined number of the power generation cells are stacked together to form a fuel cell stack. For example, the fuel cell stack is mounted in a fuel cell vehicle (fuel cell electric automobile, etc.) as an in-vehicle fuel cell stack.

To the in-vehicle fuel cell stack, sways, vibrations, and other external loads tend to be applied. Therefore, in order to achieve the desired rigidity of the entire fuel cell stack, it has been common to adopt structure where the fuel cell stack is placed in a box. Further, Japanese Laid-Open Patent Publication No. 2014-096285 discloses an in-vehicle fuel cell system aiming to make it possible to easily achieve the lightweight, reliably receive the external load, and suitably protect the fuel cell stack.

The in-vehicle fuel cell system includes a fuel cell stack, and a box containing the fuel cell stack. The box includes two side plates, an upper plate, a lower plate, and a pair of end plates. At least the upper plate or the lower plate has a rectangular shape, and a pair of corners at a pair of diagonal positions are joined to the pair of end plates, and a pair of corners at the other diagonal positions are joined to the pair of side plates.

SUMMARY OF THE INVENTION

The present invention has been made in relation to the technique of this type, and in particular, an object of the present invention is to provide a fuel cell system in which even if a stack case to contain the fuel cell stack have mating surfaces of complicated shapes, it is possible for the fuel cell system to reliably seal the inside of the stack case.

A fuel cell system according to the present invention includes a fuel cell stack formed by stacking power generation cells in a stacking direction to generate electricity by electrochemical reactions of a fuel gas and an oxygen-containing gas, and a stack case containing the fuel cell stack.

The stack case includes a pair of end plates, a pair of side plates arranged along side surfaces of the power generation cells, an upper plate provided above the power generation cells, and a lower plate provided below the power generation cells. The pair of end plates are provided at both ends of the power generation cells in the stacking direction.

A curved portion is formed at least at one corner of a surface of the end plate joined to the upper plate or the lower plate. The upper plate or the lower plate includes a curving section facing the curving section of the end plate. A seal member is interposed between the curved portion of the upper plate or the lower plate and the curved portion of the end plate.

Further, in the fuel cell system, preferably, the upper plate or the lower plate is formed by joining two plates together, and a thick plate member which is thicker than the plates is interposed between the plates along the corner.

Further, preferably, an inclined portion is provided on a surface of the thick plate member facing the end plate, and the inclined portion is formed along the shape of the curved portion of the end plate, and the inclined portion is configured to contact the curving section of the upper plate or the lower plate to press the seal member.

In the present invention, the seal member is partially interposed between the curving section of the end plate and the curved portion of the upper plate or the lower plate that face each other. In the structure, even in the case where the mating surfaces of the end plate and the upper plate or the lower plate have complicated shapes, the seal member can be provided reliably between the mating surfaces. Therefore, it becomes possible to reliably seal the inside of the stack case in an air tight manner, and a liquid tight manner.

Further, an object of the present invention is to provide a fuel cell system having simple structure in which it is possible to reliably achieve the desired sealing performance.

A fuel cell system according to the present invention includes a fuel cell stack formed by stacking power generation cells in a stacking direction to generate electricity by electrochemical reactions of a fuel gas and an oxygen-containing gas, and a stack case for containing the fuel cell stack.

The stack case includes a pair of end plates provided at both ends of the power generation cells in the stacking direction. Further, the stack case includes a pair of side plates provided along the side surfaces of the power generation cells, an upper plate provided above the power generation cells, and a lower plate provided below the power generation cells.

In this fuel cell system, the end plate and the side plate, and the upper plate, and the lower plate include a first joint surface and a second joined surface which are joined together. In a state the first joint surface and the second joined surface are overlapped with each other, the first joint surface and the second joint surface are joined together by a tightening member. Further, the first joint surface is cut in a direction away from the second joint surface to provide a step where a seal member is provided, and the tightening member is provided outside the seal member.

Further, preferably, in this fuel cell system, the step extends up to an inner surface of the end plate and the side plate facing the fuel cell stack.

Further, preferably, in this fuel cell system, a seat surface of the tightening member is provided outside the seal member.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a cross-sectional view showing the stack case, taken along a line XI-XI in FIG. 9; and FIG. 12 is a plan view showing the fuel cell stack in which the stack case is partially omitted.

DESCRIPTION OF THE PREFERRED EMBODIMENTS

Figure 1:
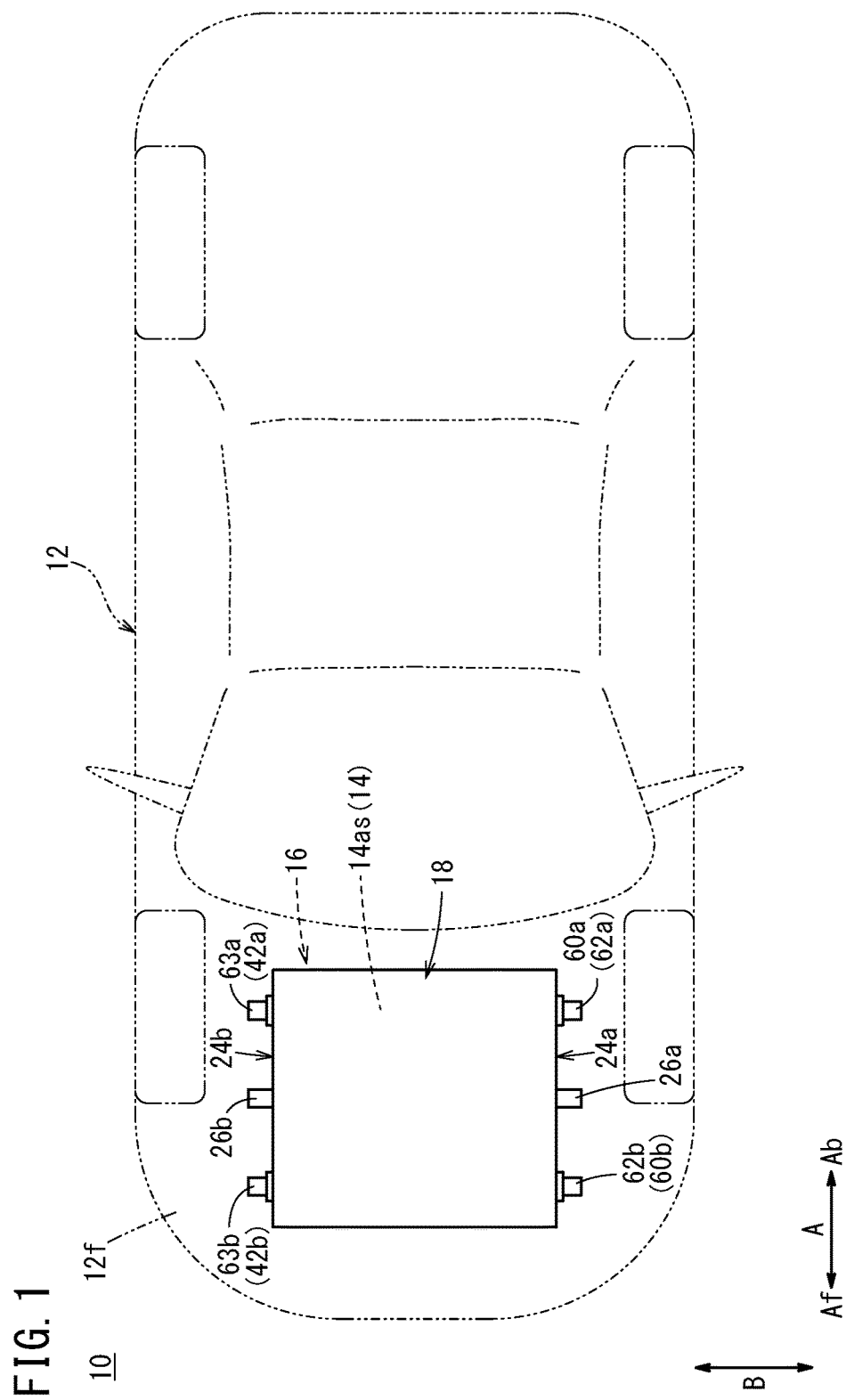
FIG. 1 is a schematic plan view showing a fuel cell electric vehicle equipped with a fuel cell system according to a first embodiment of the present invention.

As shown in FIG. 1, a fuel cell system 10 according to the first embodiment of the present invention is mounted in a front box (so called, motor room) 12f of a fuel cell electric vehicle (fuel cell vehicle) 12. The fuel cell system 10 may not be necessarily placed in the front box 12f. For example, the fuel cell system 10 may be placed under the vehicle floor at the center of the vehicle, or adjacent to a rear trunk.

Figure 2:
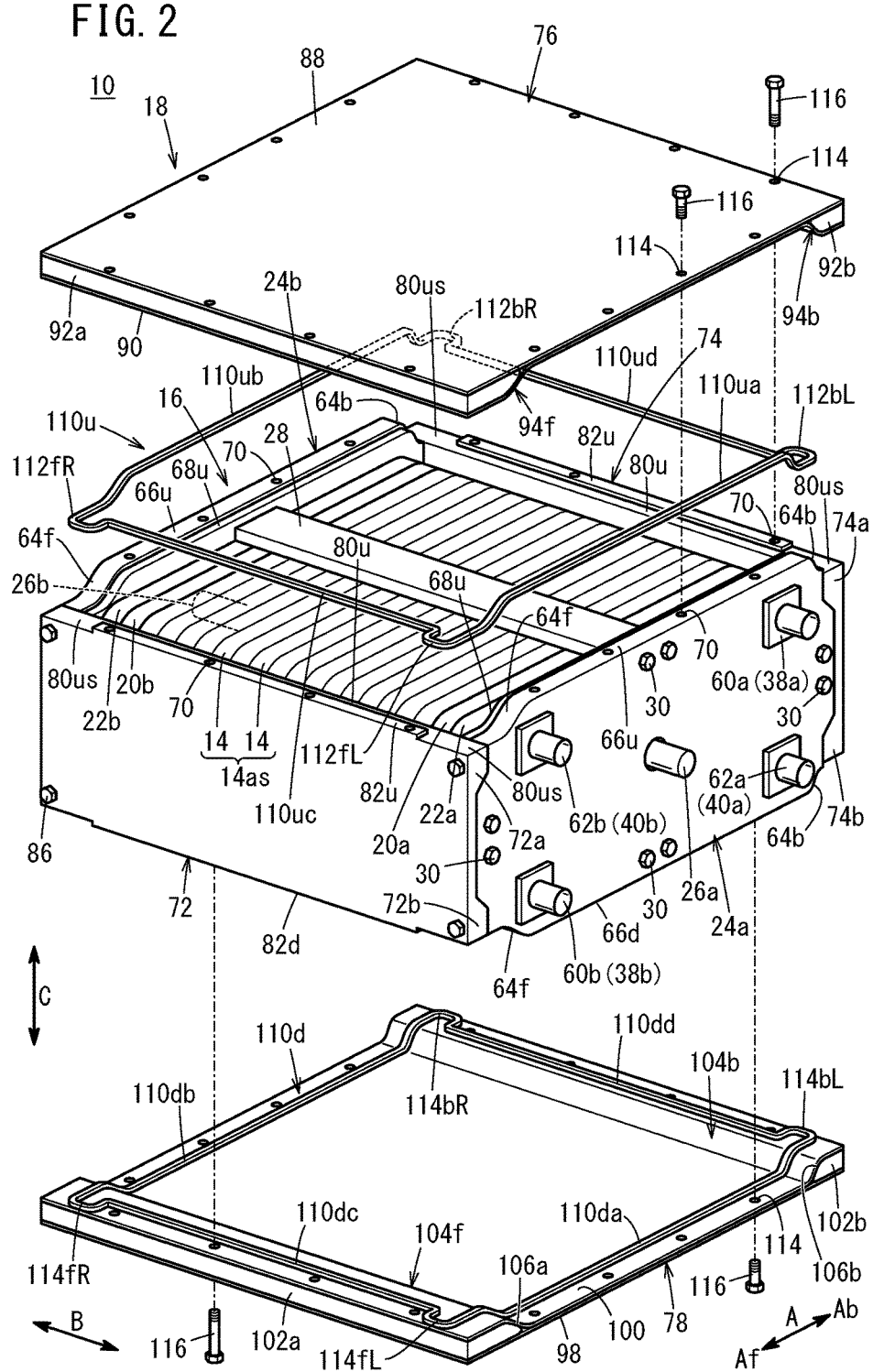
FIG. 2 is a partial exploded perspective view showing a stack case of the fuel cell system.
Figure 3:
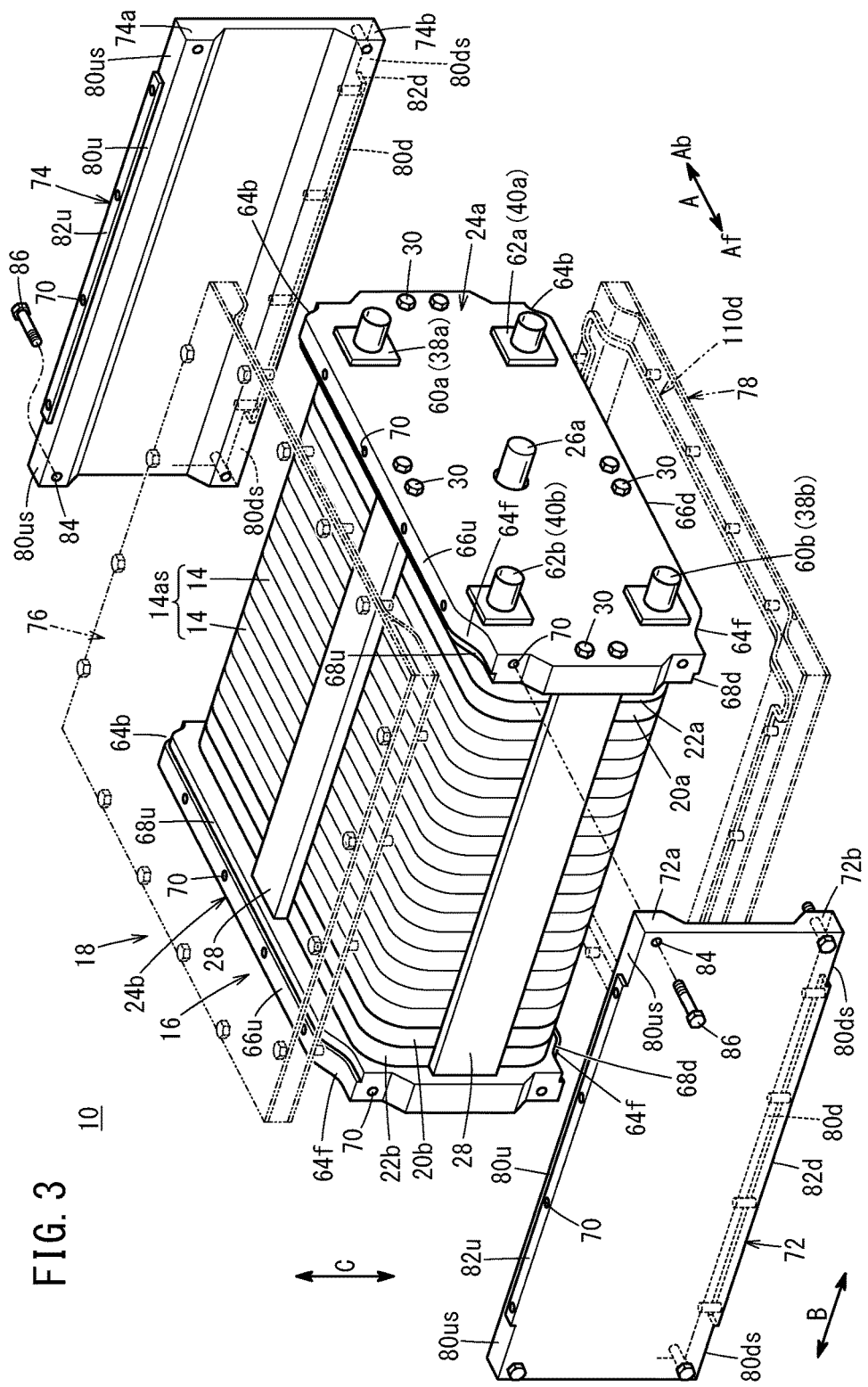
FIG. 3 is an exploded perspective view showing main components of the fuel cell system in which the stack case is partially omitted.

As shown in FIGS. 2 and 3, the fuel cell system 10 includes a fuel cell stack 16 formed by stacking a plurality of power generation cells 14, and a stack case 18 for containing the fuel cell stack 16. As shown in FIG. 2, electrode surfaces of the power generation cells 14 are oriented upright, and the power generation cells 14 are stacked together in a vehicle width direction of the fuel cell electric vehicle 12 indicated by an arrow B intersecting with a vehicle length direction (traveling direction) indicated by an arrow A. Alternatively, the power generation cells 14 may be stacked together in a vertical direction (vehicle height direction) indicated by an arrow C.

A plurality of the power generation cells 14 are stacked together in the direction indicated by the arrow B to form a stack body 14as. At one end of the stack body 14as in the stacking direction, a first terminal plate 20a is provided. A first insulating plate 22a is provided outside the first terminal plate 20a, and a first end plate 24a is provided outside the first insulating plate 22a. At the other end of the stack body 14as in the stacking direction, a second terminal plate 20b is provided. A second insulating plate 22b is provided outside the second terminal plate 20b, and a second end plate 24b is provided outside the second insulating plate 22b.

A first power output terminal 26a extends outward from a substantially central position (or a position deviated from the central position) of a laterally elongated (rectangular) first end plate 24a. The first power output terminal 26a is connected to the first terminal plate 20a. A second power output terminal 26b extends outward from a substantially central position of a laterally elongated (rectangular) second end plate 24b. The second power output terminal 26b is connected to the second terminal plate 20b (see FIG. 2).

Coupling bars 28 each having a fixed length are provided between central positions of respective sides of the first end plate 24a and the second end plate 24b. Both ends of the coupling bars 28 are fixed to the first end plate 24a and the second end plate 24b by screws 30 to apply a tightening load to the stacked power generation cells 14 in the stacking direction indicated by the arrow B.

Figure 4:
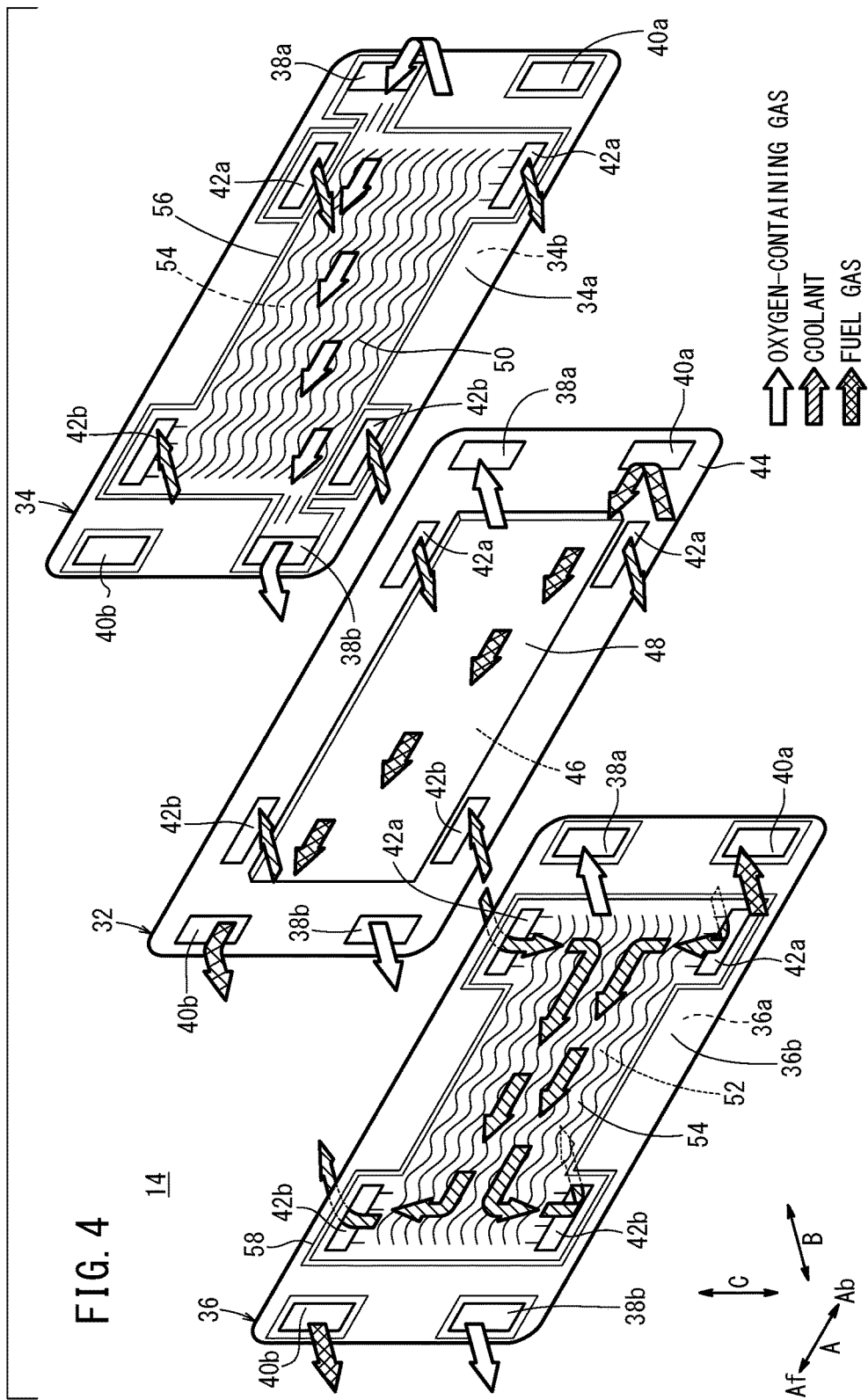
FIG. 4 is an exploded perspective view showing main components of a power generation cell of a fuel cell stack.

As shown in FIG. 4, the power generation cell 14 includes a membrane electrode assembly (MEA) 32 and a cathode separator 34 and an anode separator 36 sandwiching the membrane electrode assembly 32. Each of four corners of the power generation cells 14 has a curved shape. The cathode separator 34 and the anode separator 36 have a laterally elongated shape including long sides extending in a horizontal direction indicated by the arrow A and short sides extending in a gravity direction indicated by an arrow C.

For example, the cathode separator 34 and the anode separator 36 are metal thin plates such as steel plates, stainless steel plates, titanium plates, aluminum plates, plated steel sheets, or metal plates having anti-corrosive surfaces by surface treatment. Each of the cathode separator 34 and the anode separator 36 have rectangular surfaces, and are formed by corrugating the metal thin plates by press forming to have a corrugated shape in cross section and a wavy shape on the surface. Instead of the metal separators, for example, carbon separators may be used as the cathode separator 34 and the anode separator 36.

At one end of the power generation cells 14 in a longitudinal direction indicated by the arrow A, an oxygen-containing gas supply passage 38a and a fuel gas supply passage 40a are provided. The oxygen-containing gas supply passage 38a and the fuel gas supply passage 40a individually extend through the power generation cells 14 in the direction indicated by the arrow B. An oxygen-containing gas is supplied to the power generation cells 14 through the oxygen-containing gas supply passage 38a, and a fuel gas such as a hydrogen-containing gas is supplied to the power generation cells 14 through the fuel gas supply passage 40a.

At the other end portion of the power generation cells 14 in the longitudinal direction, a fuel gas discharge passage 40b for discharging the fuel gas and an oxygen-containing gas discharge passage 38b for discharging the oxygen-containing gas are provided. The fuel gas discharge passage 40b and the oxygen-containing gas discharge passage 38b individually extend through the power generation cells 14 in the direction indicated by the arrow B.

At both of opposite marginal portions of the power generation cell 14 in the direction indicated by the arrow C, two coolant supply passages 42a for supplying a coolant are provided on one side in the horizontal direction, i.e., adjacent to the oxygen-containing gas supply passage 38a and the fuel gas supply passage 40a. The two coolant supply passages 42a individually extend through the power generation cells 14 in the direction indicated by the arrow B for supplying a coolant. The coolant supply passages 42a are provided on upper and lower opposite sides.

At both of opposite marginal portions of the power generation cell 14 in the direction indicated by the arrow C, two coolant discharge passages 42b for discharging a coolant are provided on the other side in the horizontal direction, i.e., adjacent to the fuel gas discharge passage 40b and the oxygen-containing gas discharge passage 38b. The two coolant discharge passages 42b individually extend through the power generation cells 14 in the direction indicated by the arrow B for discharging the coolant. The coolant discharge passages 42b are provided on upper and lower opposite sides.

The membrane electrode assembly 32 includes a cathode 46 and an anode 48, and a solid polymer electrolyte membrane 44 interposed between the cathode 46 and the anode 48. The solid polymer electrolyte membrane 44 is formed by impregnating a thin membrane of perfluorosulfonic acid with water, for example.

Each of the cathode 46 and the anode 48 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 46 and the electrode catalyst layer of the anode 48 are fixed to both surfaces of the solid polymer electrolyte membrane 44, respectively.

The cathode separator 34 has an oxygen-containing gas flow field 50 on its surface 34a facing the membrane electrode assembly 32. The oxygen-containing gas flow field 50 is connected to the oxygen-containing gas supply passage 38a and the oxygen-containing gas discharge passage 38b. The oxygen-containing gas flow field 50 includes a plurality of wavy flow grooves (or straight flow grooves) extending in the direction indicated by the arrow A.

The anode separator 36 has a fuel gas flow field 52 on its surface 36a facing the membrane electrode assembly 32. The fuel gas flow field 52 is connected to the fuel gas supply passage 40a and the fuel gas discharge passage 40b. The fuel gas flow field 52 includes a plurality of wavy flow grooves (or straight flow grooves) extending in the direction indicated by the arrow A. In the drawings, the oxygen-containing gas in the oxygen-containing gas flow field 50 and the fuel gas in the fuel gas flow field 52 flow in the same direction, i.e., in a parallel flow manner. However, the present invention is not limited in this respect. The oxygen-containing gas in the oxygen-containing gas flow field 50 and the fuel gas in the fuel gas flow field 52 may flow in different directions, i.e., may flow in a counter flow manner.

A coolant flow field 54 is formed between the adjacent anode and cathode separators 34, 36, i.e., between a surface 36b of the anode separator 36 and a surface 34b of the cathode separator 34. The coolant flow field 54 is connected to the coolant supply passages 42a and the coolant discharge passages 42b. The coolant flow field 54 extends in the horizontal direction, and in the coolant flow field 54, the coolant flows over the electrode area of the membrane electrode assembly 32.

A first seal member 56 is formed integrally with the surfaces 34a, 34b of the cathode separator 34, around the outer end of the cathode separator 34. A second seal member 58 is formed integrally with the surfaces 36a, 36b of the anode separator 36, around the outer end of the anode separator 36.

Each of the first seal member 56 and the second seal member 58 is an elastic seal member made of seal material, cushion material, or packing material such as an EPDM rubber (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIGS. 2 and 3, an oxygen-containing gas supply manifold member 60a, an oxygen-containing gas discharge manifold member 60b, a fuel gas supply manifold member 62a, and a fuel gas discharge manifold member 62b are attached to the first end plate 24a.

The oxygen-containing gas supply manifold member 60a is connected to the oxygen-containing gas supply passage 38a, the oxygen-containing gas discharge manifold member 60b is connected to the oxygen-containing gas discharge passage 38b, the fuel gas supply manifold member 62a is connected to the fuel gas supply passage 40a, and the fuel gas discharge manifold member 62b is connected to the fuel gas discharge passage 40b.

As shown in FIG. 1, a coolant supply manifold member 63a is attached to the second end plate 24b. The coolant supply manifold member 63a is connected to the pair of coolant supply passages 42a. A coolant discharge manifold member 63b is attached to the second end plate 24b. The coolant discharge manifold member 63b is connected to the pair of coolant discharge passages 42b.

Figure 5:
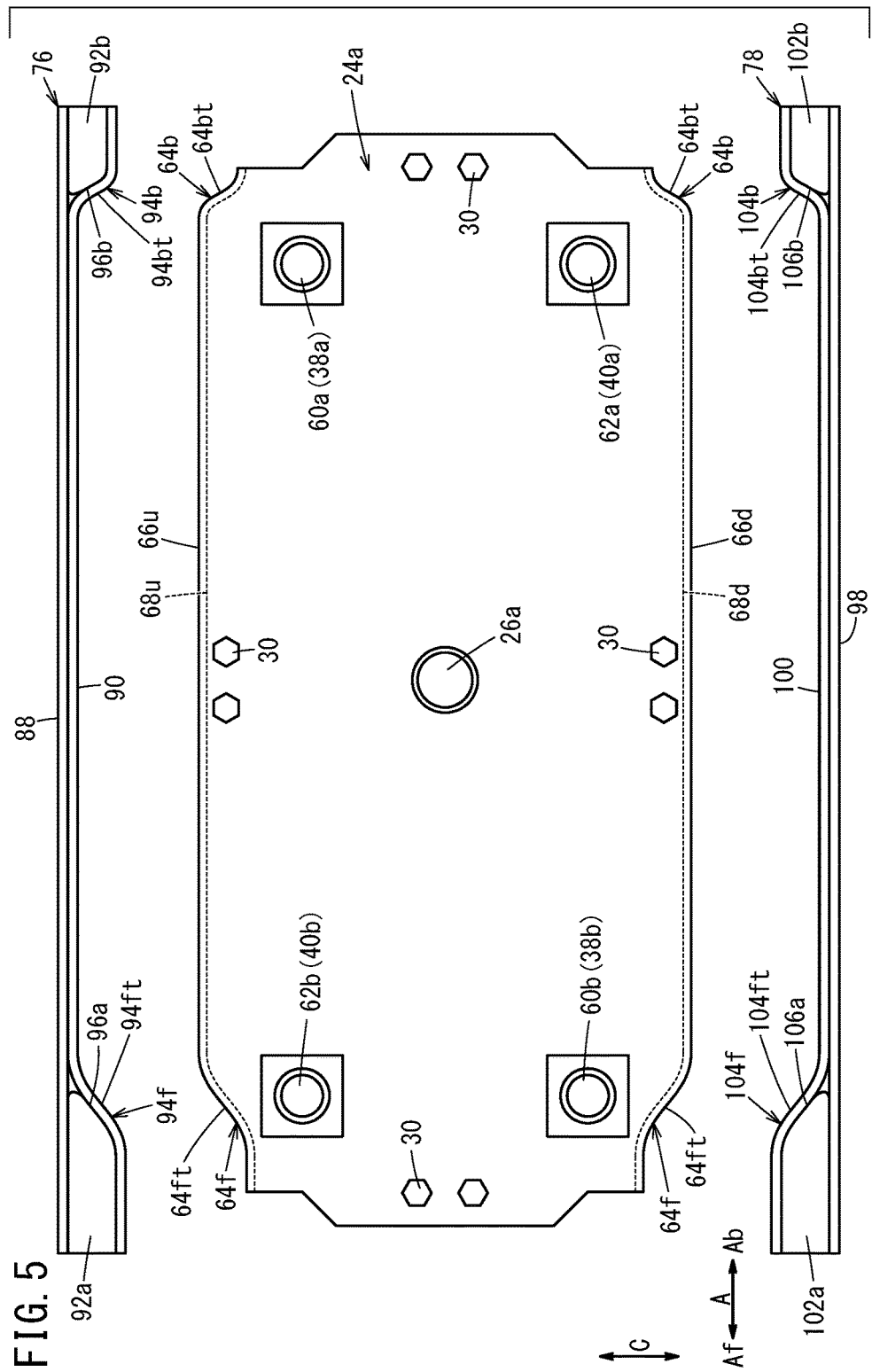
FIG. 5 is a front view showing a state where a first end plate and an upper plate and a lower plate of the fuel cell stack are separated.

As shown in FIGS. 2, 3, and 5, curved portions 64f are formed at upper and lower corners of the first end plate 24a at the front end in the vehicle length direction, respectively. The curved portions 64f are convex. The upper curved portion 64f is formed at one corner of an upper surface 66u joined to an upper plate 76 described later. The lower curved portion 64f is formed at one corner of a lower surface 66d joined to a lower plate 78 described later. Each of the curved portions 64f has a straight portion 64ft at the center (see FIG. 5).

Curved portions 64b are formed at upper and lower corners of the first end plate 24a at the rear end in the vehicle length direction, respectively. The curved portions 64b are convex. The upper curved portion 64b is formed at one corner of an upper surface 66u joined to the upper plate 76 described later. The lower curved portion 64b is formed at one corner of a lower surface 66d joined to the lower plate 78 described later. Each of the curved portions 64b has a straight portion 64bt at the center (see FIG. 5).

In the illustrated embodiment, the curved portion 64f and the curved portion 64b have different sizes. However, the curved portion 64f and the curved portion 64b may have the same size. Further, in the illustrated embodiment, the two curved portions 64f and the two curved portion 64b are provided. However, it is sufficient to provide at least only one curved portion or one for each curved portion.

The inner side of an upper surface 66u (stack body 14as side) of the first end plate 24a is cut by a predetermined depth to form an upper groove 68u over the entire surface in the direction indicated by the arrow A. The inner side of a lower surface 66d (stack body 14as side) of the first end plate 24a is cut by a predetermined depth to form a lower groove 68d over the entire surface in the direction indicated by the arrow A. A plurality of screw holes 70 are formed in the outer surface of the first end plate 24a.

The second end plate 24b has the same structure as the first end plate 24a. The constituent elements of the second end plate 24b that are identical to those of the first end plate 24a are labeled with the same reference numeral, and detailed description thereof is omitted.

As shown in FIGS. 2 and 3, the first end plate 24a and the second end plate 24b are two sides (surfaces) of the stack case 18 at both ends in the vehicle width direction indicated by the arrow B. A front side plate 72 and a rear side plate 74 each having a laterally elongated plate shape are two sides (surfaces) of the stack case 18 at both ends in the vehicle length direction indicated by the arrow A. The upper plate 76 and the lower plate 78 each having a laterally elongated plate shape are two sides (surfaces) of the stack case 18 at both ends in the vehicle height direction indicated by the arrow C.

It should be noted a pair of end plates which are provided in addition to the first end plate 24a and the second end plate 24b may be used for the stack case 18. In this case, the pair of end plates provided at the outermost positions have the same structure as the first end plate 24a and the second end plate 24b.

The front side plate 72 and the rear side plate 74 are formed, for example, by extrusion, molding, machining or the like. The front side plate 72 has a laterally elongated plate shape oriented in the vertical direction. Inner expansions 72a, 72b expanded inward of the stack case 18 are formed at upper and lower positions of the front side plate 72.

An upper groove 80u is formed on the inner side of an upper surface 82u (stack body 14as side) of the front side plate 72 over the entire surface in the direction indicated by the arrow B. The upper groove 80u is formed by cutting the inner side of the upper surface 82u by a predetermined depth. Wide flat surfaces 80us are formed at both ends of the upper groove 80u in the direction indicated by the arrow B. A lower groove 80d is formed on the inner side of a lower surface 82d (stack body 14as side) of the front side plate 72 over the entire surface in the direction indicated by the arrow B. The lower groove 80d is formed by cutting the inner side of the lower surface 82d by a predetermined depth. Wide flat surfaces 80ds are formed at both ends of the lower groove 80d in the direction indicated by the arrow B.

A plurality of screw holes 70 are formed in the upper surface 82u and the lower surface 82d of the front side plate 72. Holes 84 are formed in a vertical surface of the front side plate 72, at upper and lower positions of both ends in the direction indicated by the arrow B. Bolts 86 are inserted into the holes 84, and screwed into screw holes 70 formed on side surfaces of the first end plate 24a and the second end plate 24b.

As shown in FIG. 2, the upper surfaces 66u of the first end plate 24a and the second end plate 24b are higher than the upper surface 82u of the front side plate 72 (the upper surfaces 66u of the first end plate 24a and the second end plate 24b and the upper surface 82u of the front side plate 72 have different heights). The lower surfaces 66d of the first end plate 24a and the second end plate 24b are lower than the lower surface 82d of the front side plate 72 (the lower surfaces 66d of the first end plate 24a and the second end plate 24b and the lower surface 82d of the front side plate 72 have different heights).

As shown in FIG. 3, the rear side plate 74 has a laterally elongated plate shape, and the rear side plate 74 is oriented in the vertical direction. Inner expansions 74a, 74b expanded inward of the stack case 18 are formed at upper and lower positions of the rear side plate 74. The rear side plate 74 has the same structure as the front side plate 72. The constituent elements of the rear side plate 74 that are identical to those of the front side plate 72 are labeled with the same reference numeral, and detailed description thereof is omitted.

As shown in FIG. 2, the upper plate 76 includes an outer plate 88 and an inner plate 90 as a pair of press plates (press forming plates) that are joined together. The outer plate 88 forms an outer surface of the stack case 18, and the outer plate 88 is in a form of a thin plate. The inner plate 90 forms an inner surface of the stack case 18, and the inner plate 90 is in a form of a thin plate.

Thick plate members 92a, 92b each having a rectangular columnar shape are interposed between the outer plate 88 and the inner plate 90, at both plate ends (both ends in the direction indicated by the arrow A). The thick plate members 92a, 92b extend in the stacking direction indicated by the arrow B. In the illustrated embodiment, the thick plate member 92a is wider than the thick plate member 92b in the direction indicated by the arrow A. However, the thick plate member 92a and the thick plate member 92b may have the same width.

Figure 6:
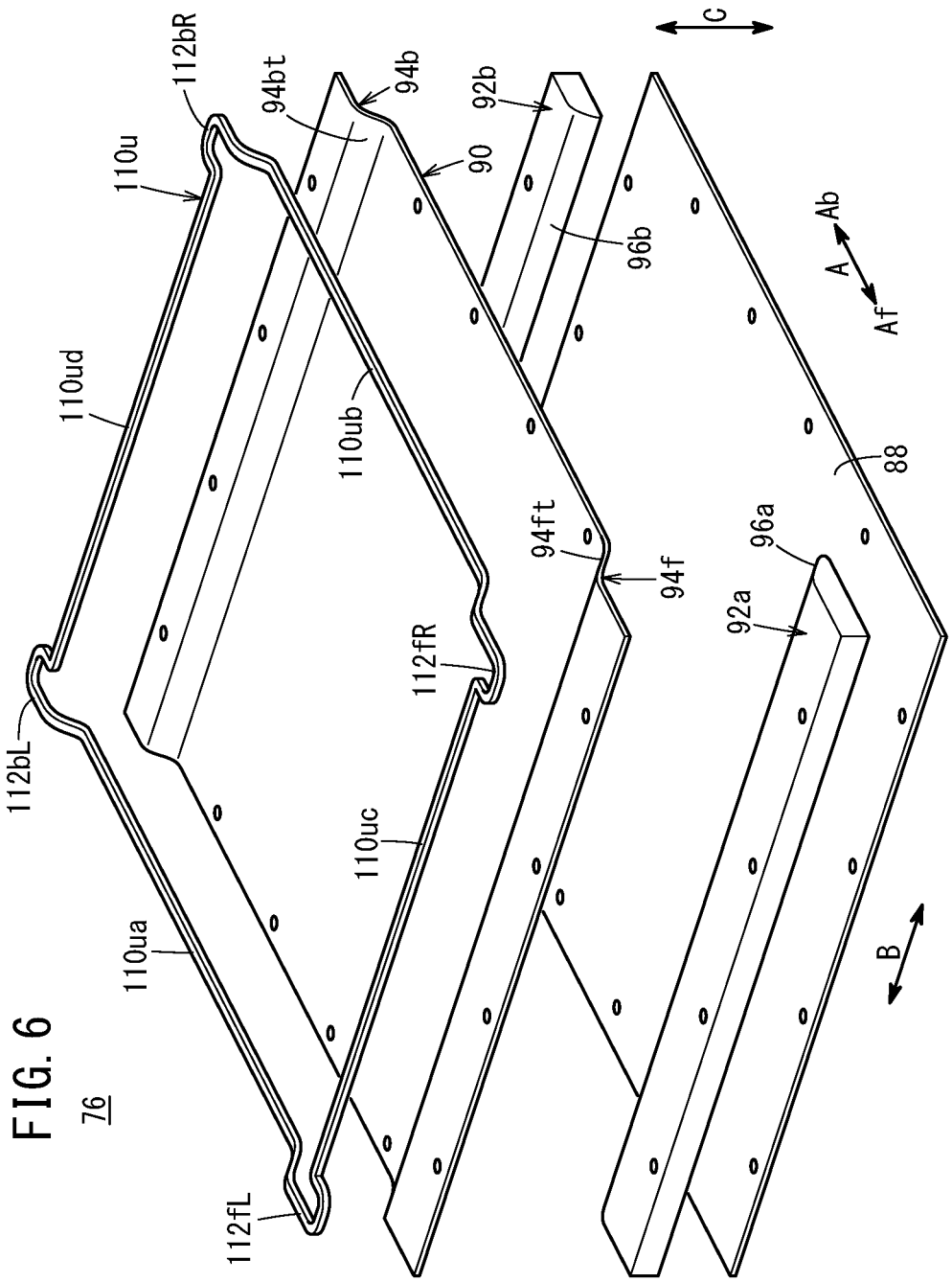
FIG. 6 is an exploded perspective view showing a state in which an upper plate of the stack case is inverted upside down.

FIG. 6 shows a state where the upper plate 76 is exploded, and inverted upside down. As shown in FIG. 6, the inner plate 90 includes curving sections 94f, 94b at both ends in the direction indicated by the arrow A. The curving sections 94f, 94b are curved toward the fuel cell stack 16 (curved inward). The curving section 94f includes a straight portion 94ft at its center. The curving section 94b includes a straight portion 94bt at its center.

As shown in FIG. 5, the curving section 94f faces the curved portion 64f of the first end plate 24a, and has the same shape as the curved portion 64f. The curving section 94b faces the curved portion 64b of the first end plate 24a, and has the same shape as the curved portion 64b.

The thick plate member 92a includes an inclined portion 96a on its surface facing the inner plate 90 (surface facing the first end plate 24a). The inclined portion 96a is inclined along the shape of the curved portion 64f of the first end plate 24a. The inclined portion 96a contacts the inner plate 90 along the curving section 94f.

The thick plate member 92b includes an inclined portion 96b on its surface facing the inner plate 90 (surface facing the first end plate 24a). The inclined portion 96b is inclined along the shape of the curved portion 64b of the first end plate 24a. The inclined portion 96b contacts the inner plate 90 along the curving section 94b.

The outer plate 88 and the inner plate 90 are joined together by MIG welding, TIG welding, etc. The thick plate members 92a, 92b are fixed to the outer plate 88 and the inner plate 90 by MIG welding, TIG welding, etc.

As shown in FIG. 2, the lower plate 78 includes an outer plate 98 and an inner plate 100 as a pair of press plates (press forming plates) that are joined together. Thick plate members 102a, 102b each having a rectangular columnar shape are interposed between the outer plate 98 and the inner plate 100, at both plate ends (both ends in the direction indicated by the arrow A). The thick plate members 102a, 102b extend in the stacking direction indicated by the arrow B. In the illustrated embodiment, the thick plate member 102a is wider than the thick plate member 102b in the direction indicated by the arrow A. However, the thick plate member 102a and the thick plate member 102b may have the same width.

The inner plate 100 includes curving sections 104f, 104b at both ends in the direction indicated by the arrow A. The curving sections 104f, 104b are curved toward the fuel cell stack 16 (convex). As shown in FIG. 5, the curving section 104f includes a straight portion 104ft at its center. The curving section 104b includes a straight portion 104bt at its center. The curving section 104f faces the curved portion 64f of the first end plate 24a, and has the same shape as the curved portion 64f. The curving section 104b faces the curved portion 64b of the first end plate 24a, and has the same shape as the curved portion 64b.

The thick plate member 102a includes an inclined portion 106a on its surface facing the inner plate 100 (surface facing the first end plate 24a). The inclined portion 106a is inclined along the shape of the curved portion 64f of the first end plate 24a. The inclined portion 106a contacts the inner plate 100 along the curving section 104f.

The thick plate member 102b includes an inclined portion 106b on its surface facing the inner plate 100 (surface facing the first end plate 24a). The inclined portion 106b is inclined along the shape of the curved portion 64b of the first end plate 24a. The inclined portion 106b contacts the inner plate 100 along the curving section 104b.

The outer plate 98 and the inner plate 100 are joined together by MIG welding, TIG welding, etc. The thick plate members 102a, 102b are fixed to the outer plate 98 and the inner plate 100 by MIG welding, TIG welding, etc.

A rectangular loop shaped upper seal member 110u in a compressed state is interposed between the upper plate 76 and the first end plate 24a, the second end plate 24b, the front side plate 72, and the rear side plate 74.

Figure 7:
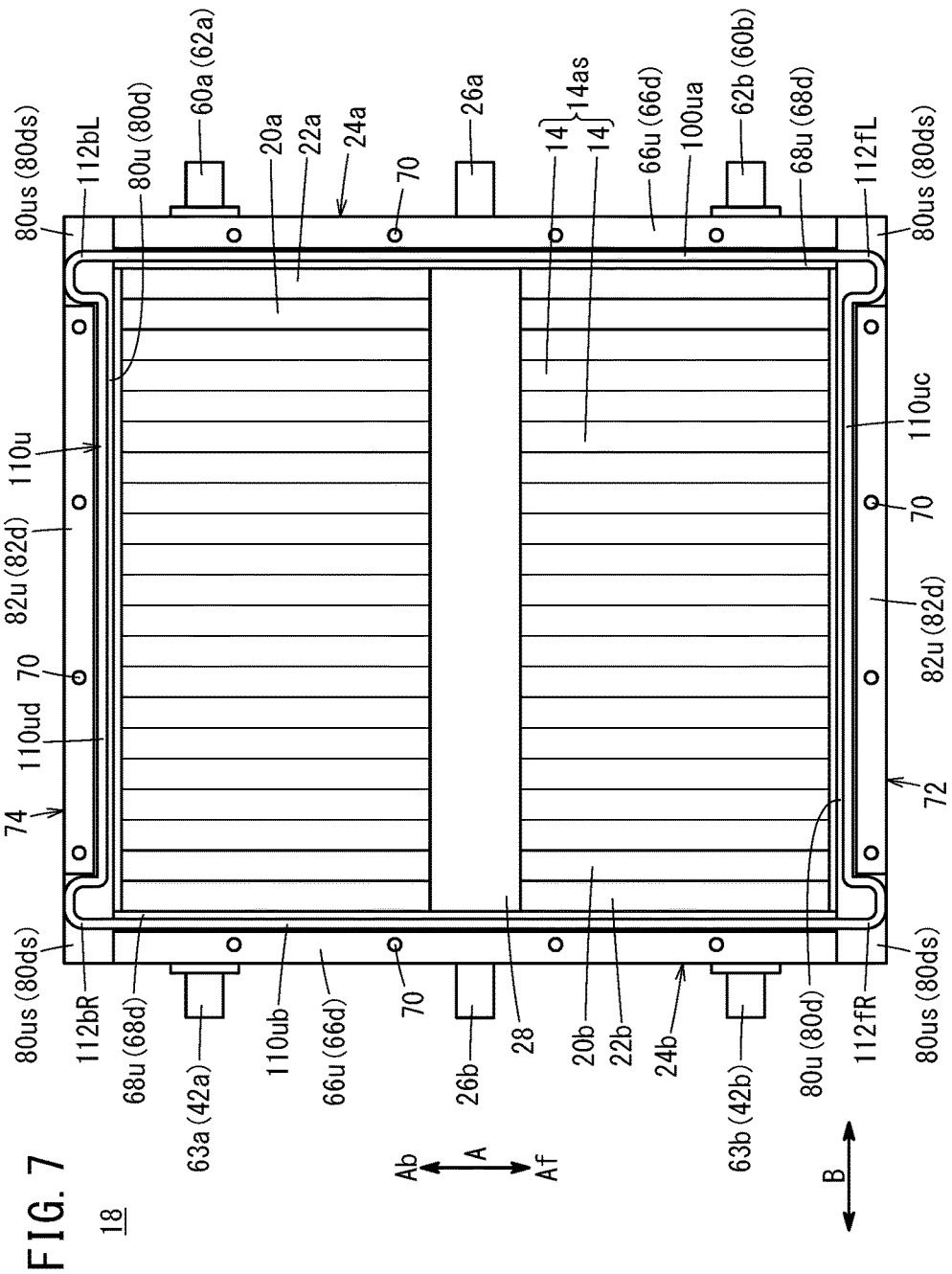
FIG. 7 is a plan view showing the stack case.

As shown in FIGS. 2, 6, and 7, the upper seal member 110u includes two sides 110ua, 110ub provided in the respective upper grooves 68u of the first end plate 24a and the second end plate 24b. Further, the upper seal member 110u includes two sides 110uc, 110ud provided in the respective upper grooves 80u of the front side plate 72 and the rear side plate 74. The two sides 110uc, 110ud are lower than the two sides 110ua, 110ub (the two sides 110uc, 110ud and the sides 110ua, 110ub have different heights) (see FIGS. 2 and 6).

The upper seal member 110u has a rectangular shape (circular shape) in cross section. Extensions 112fR, 112fL, 112bR, and 112bL are provided at four corners of the upper seal member 110u, respectively, for length adjustment. Each of the extensions 112fR, 112fL, 112bR, and 112bL has a loop shape protruding outward at each corner. In the illustrated embodiment, the extensions 112fR, 112fL, 112bR, and 112bL have different shapes. However, the extensions 112fR, 112fL, 112bR, and 112bL may have the same shape.

It should be noted that at least only one of the extensions 112fR, 112fL, 112bR, and 112bL may be provided depending on the shape at the seal position. Further, for example, only the extensions 112fR and 112bL may be provided at one pair of diagonal positions. Also in the lower seal member 110d described later, the positions and the number of the extensions may be determined as necessary. Further, the extensions may be provided for only one of the upper seal member 110u and the lower seal member 110d.

The extensions 112fL, 112fR are provided on the distal end side in the direction indicated by the arrow Af. The extensions 112fL, 112fR are provided on the respective flat surfaces 80us of the first end plate 24a and the second end plate 24b on the distal end side in the direction indicated by the arrow Af. The extensions 112bL, 112bR are provided on the distal end side in the direction indicated by the arrow Ab, and are provided on the respective flat surfaces 80us of the first end plate 24a and the second end plate 24b on the distal end side in the direction indicated by the arrow Ab.

As shown in FIG. 2, a rectangular loop shaped lower seal member 110d in a compressed state is interposed between the lower plate 78, and the first end plate 24a, the second end plate 24b, the front side plate 72, and the rear side plate 74.

The lower seal member 110d includes two sides 110da, 110db provided in the respective lower grooves 68d of the first end plate 24a and the second end plate 24b. The lower seal member 110d includes two sides 110dc, 110dd provided in the respective lower grooves 80d of the front side plate 72 and the rear side plate 74. The two sides 110dc, 110dd are higher than the two sides 110da, 110db (the two sides 110dc, 110dd and the two sides 110da, 110db have different heights).

The lower seal member 110d has a rectangular shape (circular shape) in cross section. Extensions 114fR, 114fL, 114bR, and 114bL are provided at four corners of the lower seal member 110d, respectively, for length adjustment. Each of the extensions 114fR, 114fL, 114bR, and 114bL has a loop shape protruding outward at each corner. The extensions 114fR, 114fL, 114bR, and 114bL protrude outward at the respective corners. In the illustrated embodiment, the extensions 114fR, 114fL, 114bR, and 114bL have different shapes. However, the extensions 114fR, 114fL, 114bR, and 114bL may have the same shape.

The extensions 114fL, 114fR are provided on the distal end side in the direction indicated by the arrow Af. The extensions 114fL, 114fR are provided on the respective flat surfaces 80ds of the first end plate 24a and the second end plate 24b on the distal end side in the direction indicate by the arrow Af. The extensions 114bL, 114bR are provided on the distal end side in the direction indicated by the arrow Ab. The extensions 114bL, 114bR are provided on the respective flat surfaces 80ds of the first end plate 24a and the second end plate 24b on the distal end side in the direction indicate by the arrow Ab.

The upper plate 76 and the lower plate 78 have bolt insertion holes 114, respectively. Bolts 116 are inserted into the holes 114, and screwed into screw holes 70 to fix the components of the stack case 18 together, and fix the components of the stack case 18 to the first end plate 24a and the second end plate 24b.

Operation of the fuel cell system 10 having the above structure will be described below.

Firstly, as shown in FIGS. 2 and 3, an oxygen-containing gas is supplied from the oxygen-containing gas supply manifold member 60a of the first end plate 24a to the oxygen-containing gas supply passage 38a. A fuel gas such as a hydrogen-containing gas is supplied from the fuel gas supply manifold member 62a at the first end plate 24a to the fuel gas supply passage 40a.

Further, as shown in FIG. 1, a coolant such as pure water, ethylene glycol or oil is supplied from the coolant supply manifold member 63a at the second end plate 24b to the pair of coolant supply passages 42a.

Thus, as shown in FIG. 4, the oxygen-containing gas flows from the oxygen-containing gas supply passage 38a into the oxygen-containing gas flow field 50 of the cathode separator 34. The oxygen-containing gas flows along the oxygen-containing gas flow field 50 in the direction indicated by the arrow A, and the oxygen-containing gas is supplied to the cathode 46 of the membrane electrode assembly 32 for inducing an electrochemical reaction at the cathode 46.

In the meanwhile, the fuel gas is supplied from the fuel gas supply passage 40a to the fuel gas flow field 52 of the anode separator 36. The fuel gas moves along the fuel gas flow field 52 in the direction indicated by the arrow A, and the fuel gas is supplied to the anode 48 of the membrane electrode assembly 32 for inducing an electrochemical reaction at the anode 48.

Thus, in the membrane electrode assembly 32, the oxygen-containing gas supplied to the cathode 46 and the fuel gas supplied to the anode 48 are consumed in the electrochemical reactions at catalyst layers of the cathode 46 and the anode 48 for generating electricity. Therefore, the fuel cell electric vehicle 12 travels consuming the electricity supplied from the fuel cell system 10.

Then, the remainder of the oxygen-containing gas after being consumed at the cathode 46 of the membrane electrode assembly 32 is discharged along the oxygen-containing gas discharge passage 38b in the direction indicated by the arrow B. In the meanwhile, the remainder of the fuel gas after being consumed at the anode 48 of the membrane electrode assembly 32 is discharged along the fuel gas discharge passage 40b in the direction indicated by the arrow B.

Further, the coolant supplied to the pair of coolant supply passages 42a flows into the coolant flow field 54 between the cathode separator 34 and the anode separator 36. The coolant temporarily flows inward in the direction indicated by the arrow C, and then, the coolant moves in the direction indicated by the arrow A for cooling the membrane electrode assembly 32. After the coolant temporarily moves outward in the direction indicated by the arrow C, the coolant is discharged along the pair of coolant discharge passages 42b in the direction indicated by the arrow B.

In the embodiment of the present invention, as shown in FIGS. 2 and 5, each of the four corners of the first end plate 24a and the second end plate 24b has a curved shape. Both ends of the upper plate 76 and the lower plate 78 in the direction indicated by the arrow A have shapes corresponding to the curved shapes of the first end plate 24a and the second end plate 24b.

Figure 8:
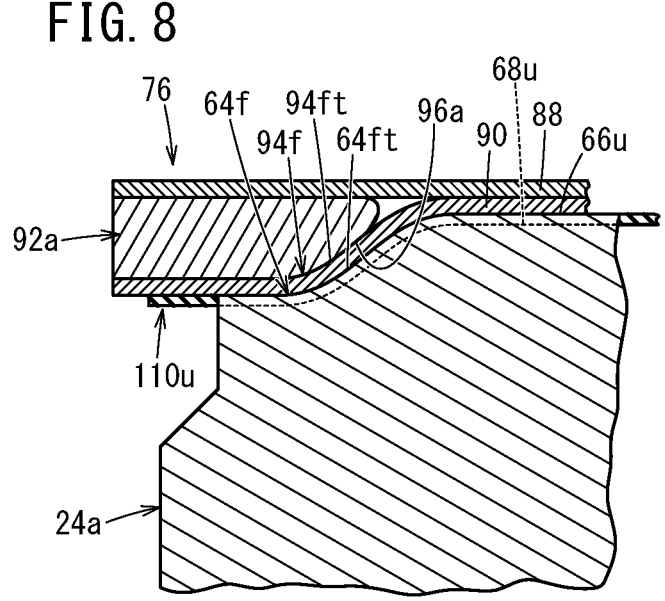
FIG. 8 is a partial enlarged cross-sectional view showing the first end plate and the upper plate.

Specifically, as shown in FIGS. 5 and 8, the curved portion 64f is formed at one corner of the first end plate 24a. The curved portion 64f includes the straight portion 64ft at its center. The inner plate 90 of the upper plate 76 has the curving section 94f facing the curved portion 64f. The curving section 94f includes the straight portion 94ft at its center.

Further, the curved portion 64f of the first end plate 24a and the curving section 94f of the upper plate 76 face, and contact each other. Part of the upper seal member 110u in the compressed state is provided in the upper groove 68u of the first end plate 24a, between the curved portion 64f and the curving section 94f. Therefore, even in the case where the mating surfaces of the first end plate 24a and the upper plate 76 have complicated shapes, the upper seal member 110u can be interposed reliably between the mating surfaces.

Further, the thick plate member 92a includes the inclined portion 96a on the surface facing the inner plate 90 (surface facing the first end plate 24a). The inclined portion 96a is inclined along the shape of the curved portion 64f of the first end plate 24a. Thus, the inclined portion 96a contacts the inner plate 90 along the curving section 94f, and can reliably presses the upper seal member 110u through the curving section 94f along the inclination of the upper groove 68u.

Likewise, the upper seal member 110u can be interposed reliably between the curved portion 64b and the curving section 94b. Further, the curved portions 64f, 64b are provided at both ends of the first end plate 24a, and the curving sections 94f, 94b are provided at both ends of the upper plate 76. Therefore, even in the case where deviation occurs in the distance between the two curved portions 64f, 64b, the curved portions 64f, 64b contact the curving sections 94f, 94b of the upper plate 76 for allowing the upper seal member 110u to exert the desired sealing function reliably.

The lower seal member 110d in the compressed state is interposed between the curved portion 64f and the curving section 104f of the lower plate 78, and between the curved portion 64b and the curving section 104b of the lower plate 78.

Further, the second end plate 24b has the same structure as the first end plate 24a. In the structure, it is possible to seal the inside of the stack case 18 in an air tight manner and liquid tight manner advantageously.

Next, a fuel cell system 10a according to a second embodiment of the present invention shown in FIG. 9 will be described. In the second embodiment, the structural components that are identical to those of the first embodiment are labeled with the same reference numeral, and description thereof is omitted.

In the same manner as the fuel cell system 10 (FIG. 1), the fuel cell system 10a is mounted in a front box (so called, motor room) 12f of a fuel cell electric vehicle (fuel cell vehicle) 12. The fuel cell system 10a may not be necessarily placed in the front box 12f. For example, the fuel cell system 10a may be placed under the vehicle floor at the center of the vehicle, or adjacent to a rear trunk.

Figure 9:
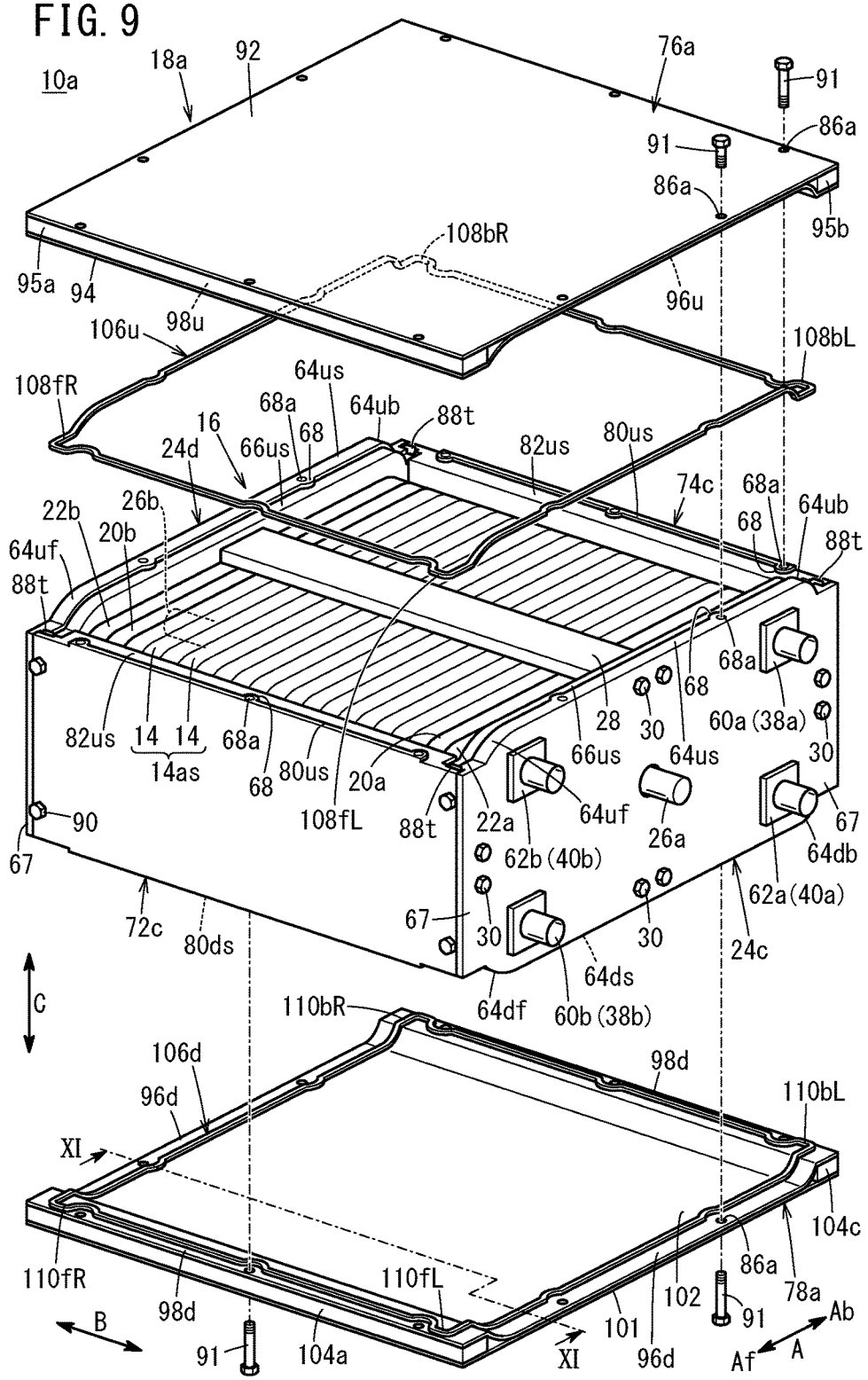
FIG. 9 is a partial exploded perspective view showing a stack case of a fuel cell system according to a second embodiment of the present invention.
Figure 10:
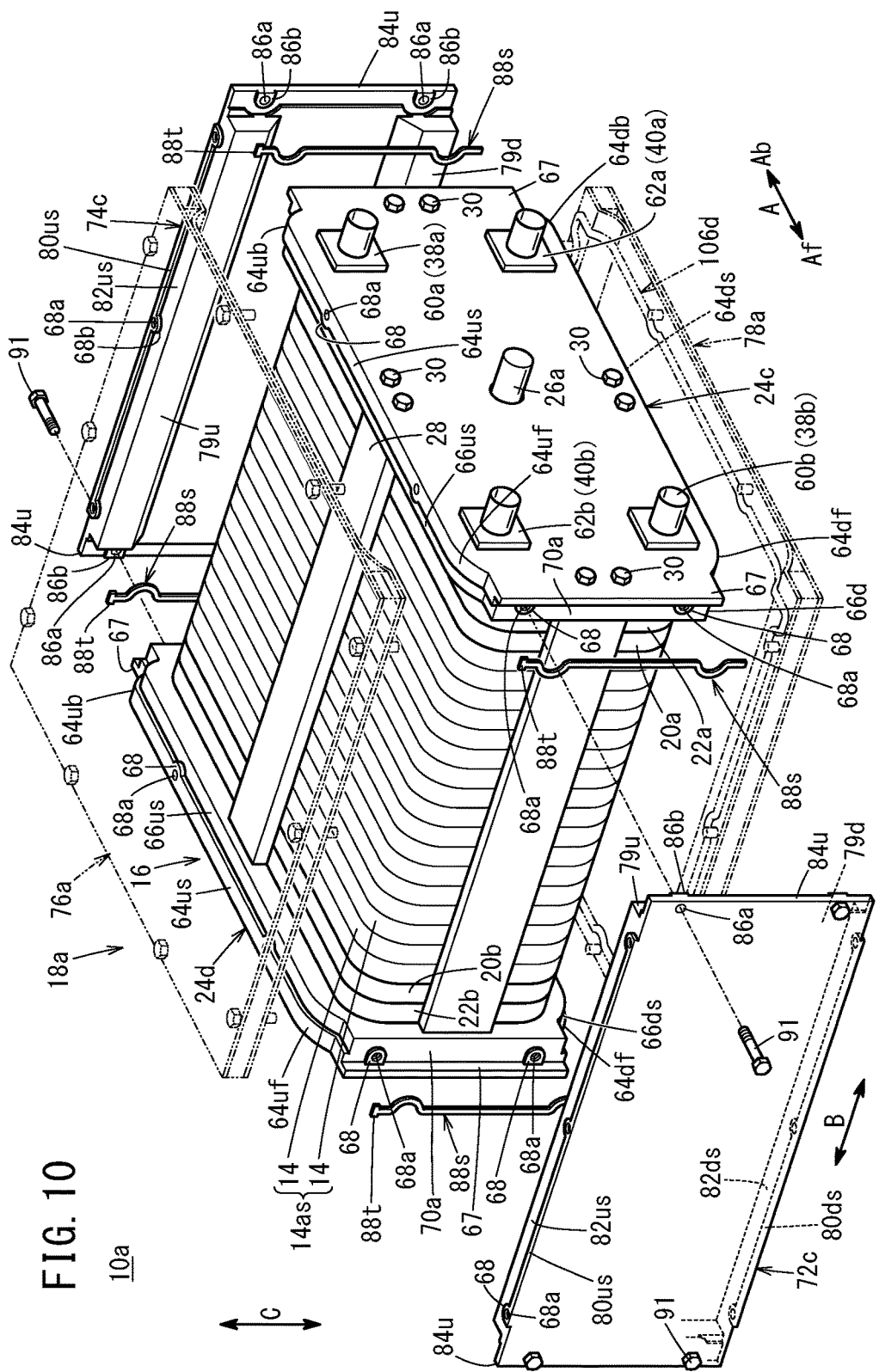
FIG. 10 is an exploded view showing the fuel cell system shown in FIG. 9 in which the stack case is partially omitted.

As shown in FIGS. 9 and 10, the fuel cell system 10a includes a fuel cell stack 16 formed by stacking a plurality of power generation cells 14, and a stack case 18a containing the fuel cell stack 16.

A plurality of the power generation cells 14 are stacked together in the direction indicated by the arrow B to form a stack body 14as. At one end of the stack body 14as in the stacking direction, a first terminal plate 20a is provided. A first insulating plate 22a is provided outside the first terminal plate 20a, and a first end plate 24c is provided outside the first insulating plate 22a. At the other end of the stack body 14as in the stacking direction, a second terminal plate 20b is provided. A second insulating plate 22b is provided outside the second terminal plate 20b, and a second end plate 24d is provided outside the second insulating plate 22b.

A first power output terminal 26a extends outward from a substantially central position (or a position deviated from the central position) of a laterally elongated (rectangular) first end plate 24c. The first power output terminal 26a is connected to the first terminal plate 20a. A second power output terminal 26b extends outward from a substantially central position of a laterally elongated (rectangular) second end plate 24d. The second power output terminal 26b is connected to the second terminal plate 20b (see FIG. 9).

Coupling bars 28 each having a fixed length are provided between central positions of respective sides of the first end plate 24c and the second end plate 24d. Both ends of the coupling bars 28 are fixed to the first end plate 24c and the second end plate 24d (stack body 14as) by screws 30 to apply a tightening load to the stacked power generation cells 14 in the stacking direction indicated by the arrow B.

As shown in FIGS. 9 and 10, an oxygen-containing gas supply manifold member 60a, an oxygen-containing gas discharge manifold member 60b, a fuel gas supply manifold member 62a, and a fuel gas discharge manifold member 62b are attached to the first end plate 24c.

A coolant supply manifold member 63a (FIG. 1) is attached to the second end plate 24d. The coolant supply manifold member 63a is connected to the pair of coolant supply passages 42a. A coolant discharge manifold member 63b (FIG. 1) is attached to the second end plate 24d. The coolant discharge manifold member 63b is connected to the pair of coolant discharge passages 42b.

As shown in FIGS. 9 and 10, first upper joint surfaces 64us are provided at upper positions of the first end plate 24c and the second end plate 24d. The first upper joint surfaces 64us are joined to the upper plate 76a described later. Curved surfaces 64uf, 64ub are formed at respective corners of the first upper joint surface 64us, at both ends in the vehicle length direction. The curved surfaces 64uf, 64ub are convex.

The upper surface of the first upper joint surface 64us on the stack body 14as side is cut in a direction away from the upper plate 76a (downward) by a predetermined depth to form an upper step 66*us* over the entire surface in the direction indicated by the arrow A. The upper steps 66*us* extend up to the inner surfaces of the first end plate 24*c* and the second end plate 24*d* on the fuel cell stack 16 side, i.e., each of the upper steps 66*us* has a groove on one side. As show in FIGS. 9, 10, and 11, a predetermined number of seat surfaces 68 are formed in the first upper joint surface 64*us*, outside the upper steps 66*us*. A screw hole 68*a* is formed in each of the seat surfaces 68.

A first lower joint surface 64*ds* is provided at a lower position of each of the first end plate 24*c* and the second end plate 24*d*. The first lower joint surface 64*ds* is joined to a lower plate 78*a* described later. The first lower joint surface 64*ds* includes curved surfaces 64*df*, 64*db* at respective corners, at both ends in the vehicle length direction. The curved surfaces 64*df*, 64*db* are convex, respectively.

The lower surface of the first lower joint surface 64*d* on the stack body 14*as* side is cut in a direction away from the lower plate 78*a* (upward) by a predetermined length to form the lower step 66*ds* over the entire surface in the direction indicated by the arrow A. As shown in FIG. 11, the lower steps 66*ds* extend up to the inner surfaces of the first end plate 24*c* and the second end plate 24*d* on the fuel cell stack 16 side, i.e., each of the lower steps 66*ds* has a groove on one side.

In the same manner as the upper step 66*us*, the first lower joint surface 64*ds* includes a predetermined number of seat surfaces 68, outside the lower step 66*ds*, and a screw hole 68*a* is formed in each of the seat surfaces 68. In the illustrated embodiment, the curved surfaces 64*uf*, 64*df*, and the curved surfaces 64*ub*, 64*db* have different radiuses of curvature. However, the curved surfaces 64*uf*, 64*df*, and the curved surfaces 64*ub*, 64*db* may have the same radius of curvature.

As shown in FIGS. 9 and 10, thin projections 67 are formed at both ends (at both of short sides) of the first end plate 24*c* and the second end plate 24*d* in the direction indicated by the arrow A, respectively. The projections 67 protrude outward. Seal surfaces 70*a* are formed inside (stack body 14*as* side) of the projections 67. The seal surfaces 70*a* face the front side plate 72*c* and the rear side plate 74*c*, and the seal surfaces 70*a* extend in a flat shape vertically. A plurality of seat surfaces 68 are formed on the outer surface of the first end plate 24*c* and the second end plate 24*d*, and a screw hole 68*a* is formed in each of the seat surfaces 68.

The first end plate 24*c* and the second end plate 24*d* are two sides (surfaces) of the stack case 18*a* at both ends in the vehicle width direction indicated by the arrow B. A front side plate 72*c* and a rear side plate 74*c* each having a laterally elongated plate shape are two sides (surfaces) of the stack case 18*a* at both ends in the vehicle length direction indicated by the arrow A. The upper plate 76*a* and the lower plate 78*a* are two sides (surfaces) of the stack case 18*a* at both ends in the vehicle height direction indicated by the arrow C. Each of the upper plate 76*a* and the lower plate 78*a* has a laterally elongated plate shape.

It should be noted a pair of end plates which are provided separately from the first end plate 24*c* and the second end plate 24*d* may be used as parts of the stack case 18*a*. In this case, the pair of end plates provided at the outermost positions have the same structure as the first end plate 24*c* and the second end plate 24*d*.

The front side plate 72*c* and the rear side plate 74*c* are formed, for example, by extrusion, molding, machining or the like. Each of the front side plate 72*c* and the rear side plate 74*c* has a laterally elongated plate shape oriented in the vertical direction. An upper expansion 79*u* and a lower expansion 79*d* expanded inward of the stack case 18*a* are formed parallel to each other at upper and lower positions of the front side plate 72*c* and the rear side plate 74*c*.

The upper expansion 79*u* includes a first upper joint surface 80*us* joined to the upper plate 76*a*. The upper surface of the first upper joint surface 80*us* on the stack body 14*as* side is cut in a direction away from the upper plate 76*a* (downward) by a predetermined depth to form an upper step 82*us* over the entire surface in the direction indicated by the arrow B.

The upper step 82*us* extends up to the inner surfaces of the front side plate 72*c* and the rear side plate 74*c* on the fuel cell stack 16 side, i.e., the upper step 82*us* has a groove on one side. A predetermined number of seat surfaces 68 are formed in the first upper joint surface 80*us*, outside the upper step 82*us*. A screw hole 68*a* is formed in each of the seat surfaces 68.

A first lower joint surface 80*ds* is provided for the lower expansion 79*d*. The first lower joint surface 80*ds* is joined to the lower plate 78*a*. The first lower joint surface 80*ds* on the stack body 14*as* side is cut by a predetermined depth in a direction away from the lower plate 78*a* (upward) to form a lower step 82*ds* over the entire surface in the direction indicated by the arrow B. The lower step 82*ds* extends up to the inner surfaces of the front side plate 72*c* and the rear side plate 74*c* on the fuel cell stack 16 side, i.e., the lower steps 82*ds* has a groove on one side.

Though not shown, as in the case of the upper step 82*us*, a predetermined number of seat surfaces are formed in the first lower joint surface 80*ds*, outside the lower step 82*ds*. A screw hole is formed in each of the seat surfaces.

Thin portions 84*u* are formed at both ends (both sides) of the front side plate 72*c* and the rear side plate 74*c* in the direction indicated by the arrow B, and each of the thin portions 84*u* forms a seal surface facing the stack body 14*as*. Bosses 86*b* are formed in each of the thin portions 84*u*. The bosses 86*b* contact the seat surfaces 68 formed on the short sides of the first end plate 24*c* and the second end plate 24*d*. The holes 86*a* of the bosses 86*b* are positioned coaxially with the screw holes 68*a* in the seat surfaces 68.

The seal surfaces 70*a* of the first end plate 24*c* and the second end plate 24*d*, and the thin portions 84*u* of the front side plate 72*c* and the rear side plate 74*c* face each other to form mating surfaces. A seal member 88*s* extending in the vertical direction is provided for each of the mating surfaces. The seal member 88*s* has a rectangular (or square) shape in cross section, and a T-shaped end 88*t* is provided at an upper position, integrally with the seal member 88*s*.

Bolts 91 are inserted into the holes 86*a* formed in the thin portions 84*u* of the front side plate 72*c* and the rear side plate 74*c*. The bolts 91 are screwed into screw holes 68*a* formed on side surfaces of the first end plate 24*c* and the second end plate 24*d*.

As shown in FIG. 9, the upper plate 76*a* includes an outer plate 92 and an inner plate 94 as a pair of pressure plates (press forming plates) that are joined together. Rectangular columnar members 95*a*, 95*b* are interposed between the outer plate 92 and the inner plate 94, at both plate ends (both ends in the direction indicated by the arrow A). The columnar members 95*a*, 95*b* extend in the stacking direction indicated by the arrow B. In the illustrated embodiment, the rectangular columnar member 95*a* is wider than the rectangular columnar member 95*b* in the direction indicated by the arrow A. However, the rectangular columnar member 95*a* and the rectangular columnar member 95*b* may have the same width.

The inner plate 94 forms the inner surface of the stack case 18a, and the inner plate 94 is in a form of a thin plate. The inner plate 94 includes curved or bent portions, or both along the outer shape of the power generation cells 14. The outer plate 92 and the inner plate 94 are joined together by MIG welding, TIG welding, etc.

In the surface of the inner plate 94 facing the power generation cells 14, second upper joint surfaces 96u are provided at both ends in the direction indicated by the arrow B, and second upper joint surfaces 98u are provided at both ends in the direction indicated by the arrow A. As shown in FIGS. 9 and 11, the second upper joint surfaces 96u are joined to the first upper joint surfaces 64us of the first end plate 24c and the second end plate 24d. As shown in FIG. 9, the second upper joint surfaces 98u are joined to the first upper joint surfaces 80us of the front side plate 72c and the rear side plate 74c.

The lower plate 78a includes an outer plate 101 and an inner plate 102 as a pair of press plates (press forming plates) that are joined together. Rectangular columnar members 104a, 104c are interposed between the outer plate 101 and the inner plate 102, at both plate ends (both ends in the direction indicated by the arrow A). The columnar members 104a, 104c extend in the stacking direction indicated by the arrow B. In the illustrated embodiment, the rectangular columnar member 104a is wider than the rectangular columnar member 104c in the direction indicated by the arrow A. However, the rectangular columnar member 104a and the rectangular columnar member 104b may have the same width.

The inner plate 102 forms an inner surface of the stack case 18a, and the inner plate 102 is in a form of a thin plate. The inner plate 102 includes curved or bent portions, or both, corresponding to the outer shape of the power generation cells 14. The outer plate 101 and the inner plate 102 are fixed together by MIG welding, TIG welding, etc.

In the surface of the inner plate 102 facing the power generation cells 14, second lower joint surfaces 96d are provided at both ends in the direction indicated by the arrow B, and second lower joint surfaces 98d are provided at both ends in the direction indicated by the arrow A. As shown in FIGS. 9 and 11, the second lower joint surfaces 96d are joined to the first lower joint surfaces 64ds of the first end plate 24c and the second end plate 24d. As shown in FIG. 9, the second lower joint surfaces 98d are joined to the first lower joint surfaces 80ds of the front side plate 72c and the rear side plate 74c. In the illustrated embodiment, each of the upper plate 76a and the lower plate 78a is formed by stacking three members together. However, the present invention is not limited in this respect. For example, each of the upper plate 76a and the lower plate 78a may be formed by stacking two members together, or may comprise a single component.

An upper seal member (rectangular seal member) 106u having a loop shape is interposed between the upper plate 76a and the first end plate 24c, the second end plate 24d, the front side plate 72c, and the rear side plate 74c.

As shown in FIGS. 9 and 12, the upper seal member 106u is provided at each of the upper steps 66us of the first end plate 24c and the second end plate 24d, and at each of the upper steps 82us of the front side plate 72c and the rear side plate 74c. The upper seal member 106u has a rectangular shape (circular shape) in cross section. Extensions 108fR, 108fL, 108bR, and 108bL are provided at four corners of the upper seal member 106u, respectively, for length adjustment. The upper seal member 106u is provided inside the seat surfaces 68 of the first end plate 24c, the second end plate 24d, the front side plate 72c, and the rear side plate 74c. As shown in FIG. 11, the outer end of the upper seal member 106u is provided inside the inner end of the bolt 91 by a distance S.

Each of the extensions 108fR, 108fL, 108bR, and 108bL has a loop shape at each corner. The extensions 108fR, 108fL, 108bR, and 108bL protrude outward at the respective corners. In the illustrated embodiment, the extensions 108fR, 108fL, 108bR, and 108bL have different shapes. However, the extensions 108fR, 108fL, 112bR, and 108bL may have the same shape.

It should be noted that at least only one of the extensions 108fR, 108fL, 108bR, and 108bL may be provided. Further, for example, only the extensions 108fR and 108bL may be provided at one pair of diagonal positions. Also in the lower seal member 106d described later, the positions and the number of the extensions may be determined as necessary. Further, the extensions may be provided for only one of the upper seal member 106u and the lower seal member 106d.

As shown in FIG. 9, the lower seal member (rectangular seal member) 106d having a rectangular loop shape is interposed between the lower plate 78a and the first end plate 24c, the second end plate 24d, the front side plate 72c, and the rear side plate 74c.

As shown in FIG. 12, the lower seal member 106d is positioned at each of the lower steps 66ds of the first end plate 24c and the second end plate 24d, and at each of the lower steps 82ds of the front side plate 72c and the rear side plate 74c. The lower seal member 106d has a rectangular shape (circular shape) in cross section. Extensions 110fR, 110fL, 110bR, and 110bL are provided at four corners of the lower seal member 106d, respectively, for length adjustment. The lower seal member 106d is provided inside the seat surfaces 68 of the first end plate 24c, the second end plate 24d, the front side plate 72c, and the rear side plate 74c. As shown in FIG. 11, the outer end of the lower seal member 106d is provided inside the inner end of the bolts 91 by a distance S.

Each of the extensions 110fR, 110fL, 110bR, and 110bL has a loop shape at each corner. The extensions 110fR, 110fL, 110bR, and 110bL protrude outward at the respective corners. In the illustrated embodiment, the extensions 110fR, 110fL, 110bR, and 110bL have different shapes. However, the extensions 110fR, 110fL, 110bR, and 110bL may have the same shape.

As shown in FIG. 9, a plurality of bolt insertion holes 86a are formed in the upper plate 76a and the lower plate 78a, respectively. Bolts (tightening members) 91 inserted into the holes 86a are screwed into the screw holes 68a to fix the components of the stack case 18a together, and fix the components of the stack case 18a to the first end plate 24c and the second end plate 24d.

The fuel cell system 10a having the above structure is operated in the same manner as the fuel cell system 10.

In the second embodiment, as shown in FIGS. 9 and 11, the first upper joint surfaces 64us are provided at the upper positions of the first end plate 24c and the second end plate 24d. The second upper joint surfaces 96u are provided for the upper plate 76a. In the state where the first upper joint surfaces 64us and the second upper joint surfaces 96u are overlapped with each other, the first upper joint surfaces 64us and the second upper joint surfaces 96u are joined together by bolts 91 as the tightening members.

In this regard, the upper step 66us is formed in the first upper joint surface 64us, the upper seal member 106u is provided on the upper step 66us. The bolts 91 are provided outside the upper seal member 106u.

Further, the first lower joint surfaces 64*ds* are provided at the first end plate 24*c* and the second end plate 24*d*. Further, the second lower joint surfaces 96*d* are provided for the lower plate 78*a*. In the state where the first lower joint surfaces 64*ds* and the second lower joint surfaces 96*d* are overlapped with each other, the first lower joint surfaces 64*ds* and the second lower joint surfaces 96*d* are joined together by bolts 91 as the tightening members.

In this regard, the lower step 66*ds* is formed in the first lower joint surface 64*ds*, and the lower seal member 106*d* is provided along the lower step 66*ds*. The bolts 91 are provided outside the lower seal member 106*d*.

Further, as shown in FIGS. 9 and 10, the first upper joint surfaces 80*us* are provided at the upper positions of the front side plate 72*c* and the rear side plate 74*c*. The second upper joint surfaces 96*u* are provided for the upper plate 76*a*. Further, in the state where the first upper joint surfaces 80*us* and the second upper joint surfaces 96*u* are overlapped with each other, the first upper joint surfaces 80*us* and the second upper joint surfaces 96*u* are joined together by the bolts 91 as the tightening members.

In this regard, the upper step 82*us* is formed in the first upper joint surface 80*us*, and the upper seal member 106*u* is provided along the upper step 82*us*. The bolts 91 are provided outside the upper seal member 106*u*.

Further, the first lower joint surfaces 80*ds* are provided at the lower positions of the front side plate 72*c* and the rear side plate 74*c*. The second lower joint surfaces 98*d* are provided for the lower plate 78*a*. Further, in the state where the first lower joint surfaces 80*ds* and the second lower joint surfaces 98*d* are overlapped with each other, the first lower joint surfaces 80*ds* and the second lower joint surfaces 98*d* are joined together by the bolts 91 as the tightening members.

In this regard, the lower step 82*ds* is formed in the first lower joint surface 80*ds*, and the lower seal member 106*d* is provided along the lower step 82*ds*. The bolts 91 are provided outside the lower seal member 106*d*.

Therefore, the gas, in particular, the fuel gas can be sealed in an air-tight manner inside the upper seal member 106*u* and the lower seal member 106*d*. It becomes possible to prevent leakage of the fuel gas from the bolt tightening parts (screw holes 68*a*, etc.) to the outside as much as possible. Thus, with the simple structure, it is possible to reliably achieve the desired sealing performance.

Further, as shown in FIGS. 9, 10, and 11, the upper steps 66*us* and the lower steps 66*ds* extend up to the inner surfaces of the first end plate 24*c* and the second end plate 24*d* on the fuel cell stack 16 side. That is, each of the upper steps 66*us* and the lower steps 66*ds* has a groove on one side. Likewise, the upper steps 82*us* and the lower steps 82*ds* extend up to the inner surfaces of the front side plate 72*c* and the rear side plate 74*c* on the fuel cell stack 16 side. That is, each of the upper steps 82*us* and the lower steps 82*ds* has a groove on one side.

In the structure, at the time of machining the upper steps 66*us*, the lower steps 66*ds*, the upper steps 82*us*, and the lower steps 82*ds*, it is possible to use a tool having a relatively large diameter. Therefore, advantageous improvement in the productivity is achieved effectively.

Further, the upper seal member 106*u* and the lower seal member 106*d* are provided inside the seat surfaces 68 of the first end plate 24*c*, the second end plate 24*d*, the front side plate 72*c*, and the rear side plate 74*c*. Therefore, it becomes possible to reliably apply the joining force to the first upper joint surfaces 64*us*, 80*us*, the second upper joint surfaces 96*u*, 98*u*, the first lower joint surfaces 64*ds*, 80*ds*, and the second lower joint surfaces 96*d*, 98*d*, respectively.

While the invention has been particularly shown and described with reference to the preferred embodiments, it will be understood that variations and modifications can be effected thereto by those skilled in the art without departing from the scope of the invention as defined by the appended claims.

What is claimed is:

1. A fuel cell system comprising:
   a fuel cell stack formed by stacking a plurality of solid polymer electrolyte power generation cells in a stacking direction, the power generation cells generating electricity by electrochemical reaction of a fuel gas and an oxygen-containing gas; and
   a stack case containing the fuel cell stack, the stack case comprising:
   a pair of end plates, one of said end plates provided at each end of the fuel cell stack in the stacking direction, each of the end plates having an upper surface with an upper groove formed on an inner surface thereof, each of the end plates further having a plurality of holes formed therein for receiving fasteners, the holes disposed outside of the grooves;
   a pair of side plates provided along the side surfaces, respectively, of the power generation cells, each of the side plates having an upper groove formed on an inner side of an upper surface thereof, each of the side plates further having a plurality of holes formed therein for receiving fasteners, the holes disposed outside of the grooves;
   an upper plate formed separately from the side plates and provided above the power generation cells; and
   a lower plate formed separately from the side plates and provided below the power generation cells,
   wherein:
   a curved portion is formed at least at one corner of a surface of the end plate joined to the upper plate or the lower plate;
   the upper plate or the lower plate includes a thickened edge portion with a curving section facing the curved portion of the end plate; and
   a seal member is interposed in a compressed state between the curving section of the upper plate and the curved portion of the end plate, the seal member extending around the stack case and fitting into the grooves formed in the side plates and the end plates.

2. The fuel cell system of claim 1, wherein at least one of the side plates has at least one widened flat surface formed on the upper surface at an end of the upper groove thereof, and wherein the seal member comprises an extension at an area configured for placement on the widened flat surface to permit length adjustment, the extension having a loop shape protruding outwardly.

3. The fuel cell system of claim 1, wherein each of the side plates has a widened flat surface formed on the upper surface at each end of the upper groove thereof, and wherein the seal member comprises an extension formed therein at each of four areas thereof configured for placement on the widened flat surfaces to permit length adjustment, the extension having a loop shape protruding outwardly.

4. The fuel cell system according to claim 1, wherein the upper plate or the lower plate is formed by joining two plates together; and a thick plate member, which is thicker than the plates, is interposed between the plates along the corner.

5. The fuel cell according to claim 4, wherein an inclined portion is provided on a surface of the thick plate member facing the end plate, the inclined portion is formed along the shape of the curved portion of the end plate; and the inclined portion is configured to contact the curving section of the upper plate or the lower plate to press the seal member.

6. A fuel cell system comprising:
   a fuel cell stack formed by stacking a plurality of solid polymer electrolyte power generation cells in a stacking direction, the power generation cells generating electricity by electrochemical reaction of a fuel gas and an oxygen-containing gas; and
   a stack case containing the fuel cell stack, the stack case comprising:
   a pair of end plates, one of said end plates provided at each end of the fuel cell stack in a stacking direction, each of the end plates having an upper groove formed on an inner surface thereof, each of the end plates further having a plurality of holes formed therein for receiving fasteners, the holes disposed outside of the grooves;
   a pair of side plates provided along the side surfaces of the power generation cells, each of the side plates having an upper groove formed on an inner side of an upper surface thereof, each of the side plates further having a plurality of holes formed therein for receiving fasteners, the holes disposed outside of the grooves;
   an upper plate formed separately from the side plates and provided above the power generation cells; and a lower plate formed separately from the side plates and provided below the power generation cells, and
   a seal member interposed between the upper plate and the side plates and between the upper plate and the end plate, the seal member extending around the stack case and fitting into the grooves formed in the side plates and the end plates;
   wherein each side plate includes a first joint surface, and the upper plate includes a second joint surface on each side thereof, each of the second joint surfaces being joined together with a corresponding adjacent one of the first joint surfaces;
   in a state in which each of the respective adjacent first and second joint surfaces are overlapped with each other, the first joint surface and the second joint surface are joined together by a tightening member; and
   the first joint surface is cut in a direction away from the second joint surface to provide a step where the seal member is provided, and the tightening member is provided outside the seal member.

7. The fuel cell system according to claim 6, wherein the step extends up to an inner surface of the end plate and the side plate facing the fuel cell stack.

8. The fuel cell system according to claim 6, wherein a seat surface for the tightening member is provided outside the seal member.

9. The fuel cell system of claim 6, wherein at least one of the side plates has at least one widened flat surface formed on the upper surface at an end of the upper groove thereof, and wherein the seal member comprises an extension at an area configured for placement on the widened flat surface to permit length adjustment, the extension having a loop shape protruding outwardly.

10. The fuel cell system of claim 6, wherein each of the side plates has a widened flat surface formed on the upper surface at each end of the upper groove thereof, and wherein the seal member comprises an extension formed therein at each of four areas thereof configured for placement on the widened flat surfaces to permit length adjustment, the extension having a loop shape protruding outwardly.

* * * * *